United States Patent [19]

Sullivan et al.

[11] Patent Number: 4,899,838
[45] Date of Patent: Feb. 13, 1990

[54] EARTH BORING BIT WITH CONVERGENT CUTTER BEARING

[75] Inventors: Eric C. Sullivan; Bruce H. Burr, both of Houston, Tex.

[73] Assignee: Hughes Tool Company, Houston, Tex.

[21] Appl. No.: 277,616

[22] Filed: Nov. 29, 1988

[51] Int. Cl.$^4$ ............................................. E21B 10/22
[52] U.S. Cl. ....................................... 175/371; 384/95
[58] Field of Search ............... 175/227, 371, 372, 229, 175/359, 367; 384/92, 95, 96

[56] References Cited

U.S. PATENT DOCUMENTS

| | | | |
|---|---|---|---|
| 3,397,928 | 8/1968 | Galle | 308/8.2 |
| 4,157,122 | 6/1979 | Morris | 175/371 |
| 4,516,641 | 5/1985 | Burr | 175/228 |
| 4,554,985 | 11/1985 | Backlund | 175/371 |
| 4,753,304 | 6/1988 | Kelly, Jr. | 175/371 |

OTHER PUBLICATIONS

"Ball Bearing Journal", pp. 2-24, Jun. 1987.

Primary Examiner—Jerome W. Massie
Assistant Examiner—Terry Lee Melius
Attorney, Agent, or Firm—Robert A. Felsman

[57] ABSTRACT

An earth boring bit having a body and a cantilevered bearing shaft extending inwardly and downwardly from the body. A rotatable cutter with an open end is assembled over the shaft, which has a journal surface formed around a longitudinal axis. The cutter has a bearing surface sized to permit assembly over the journal surface of the shaft. At the open end of the cutter bearing surface is a seal recess which includes an intersecting wall that defines an annular, generally curved corner to oppose the journal surface of the shaft. The cutter bearing surface has a curved outer region that converges from the annular corner of the seal recess into an inner region to reduce the stress the corner induces upon the journal bearing surface of the shaft, including the stress induced by cutter cocking during drilling.

3 Claims, 3 Drawing Sheets

EARTH BORING BIT WITH CONVERGENT CUTTER BEARING

BACKGROUND OF THE INVENTION

1. Field of the Invention

This invention relates to earth boring bits, especially those having rolling cutters supported upon lubricated bearing shafts. The improvement relates specifically to the bearings in such bits.

2. Description of the Prior Art

The commercially successful earth boring bit used for drilling oil and gas wells has a body typically formed of three sections, each with a cantilevered bearing shaft that supports a rotatable cutter. An example of one of the latest versions may be seen with reference to Bruce H. Burr, U.S. Pat. No. 4,516,641.

Here, the bearing is of the "journal" type, meaning that there are no balls or rollers to support the load between the shaft and the cutter. The journal bearing has proved superior in most oil and gas well drilling environments since the inception of the successful bearing and seal system shown in U.S. Pat. No. 3,397,928 of Edward M. Galle.

In such bits there is often a high unit stress loading imposed on the journal bearing shaft by the corner region of the opposed seal ring groove in the cutter. The hard surface of the heat treated journal bearing surface sometimes cracks and spalls when subjected to sustained high unit loading imposed by the cutter, especially opposite the corner of the seal recess. This condition has been observed in bits sealed with o-rings and has become more prevalent in bits sealed with the improved metal face seals of U.S. Pat. No. 4,516,641.

SUMMARY OF THE INVENTION

It is the general object of the invention to provide an earth boring bit having a rotatable cutter supported upon a journal bearing with means to reduce the stress imposed by the cutter upon the journal during drilling, especially opposite the corner of the cutter seal recess.

This and other objects of the invention are achieved in a bit having a body and a cantilevered bearing shaft extending inwardly and downwardly from the body. A rotatable cutter with an open end is assembled over the shaft, which has a journal surface formed around a longitudinal axis. At the open end of the cutter bearing surface is a seal recess which includes an intersecting wall that defines an annular, generally curved corner to oppose the journal surface of the shaft. Within the seal recess is a seal to confine lubricant between the bearing surfaces. The cutter bearing surface bells slightly at the annular corner of the seal recess from the nominal bearing surface to reduce the stress that the corner induces upon the journal bearing surface of the shaft, including the stress induced by cutter cocking during drilling. A toroidal surface has performed advantageously, one having an inner portion with one radius and an outer portion with a smaller radius.

Additional objects, features and advantages of the invention will become apparent in the following description.

DESCRIPTION OF THE PREFERRED EMBODIMENT

Figure 1:
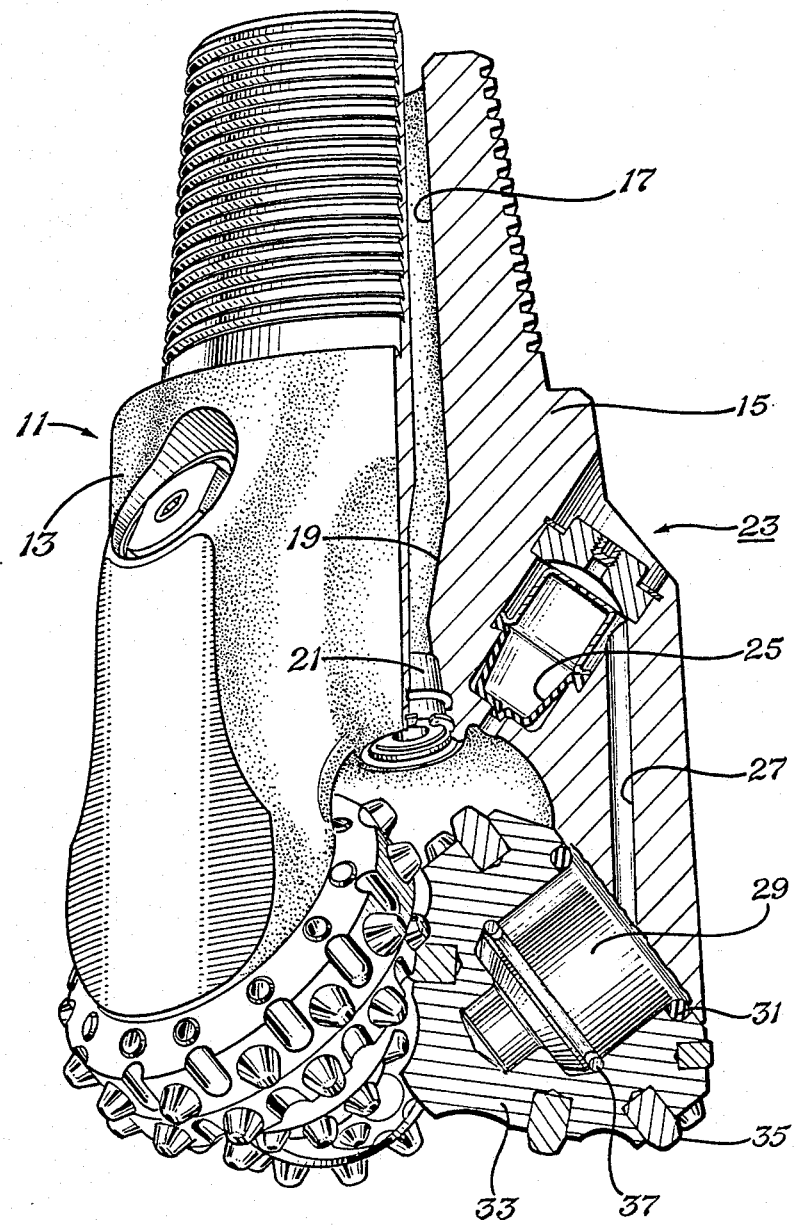
FIG. 1 is a perspective view, partially in longitudinal section, of an earth boring bit which embodies the principles of the invention.

The numeral 11 in the drawings designates an earth boring bit of the rolling cone or cutter type. Typically the bit has a body 13 constructed of three sections 15, welded to form a fluid tight central bore 17 that leads to one of three identical passages 19 and an associated wear and erosion resistant nozzle 21.

Each section 15 of the body includes a lubrication system 23 with a flexible diaphragm pressure compensator 25 to provide lubricant through a passage 27 and to a bearing means 29. A seal ring 31 confines lubricant within the bearing means 29 and inside the rotatable cutter 33 to lengthen its life and that of its earth disintegrating teeth 35. Each of the cutters 33 is retained to the bearing means 29 by suitable means such as the snap ring 37, as disclosed by Bruce H. Burr in U.S. Pat. No. 4,491,428.

Figure 2:
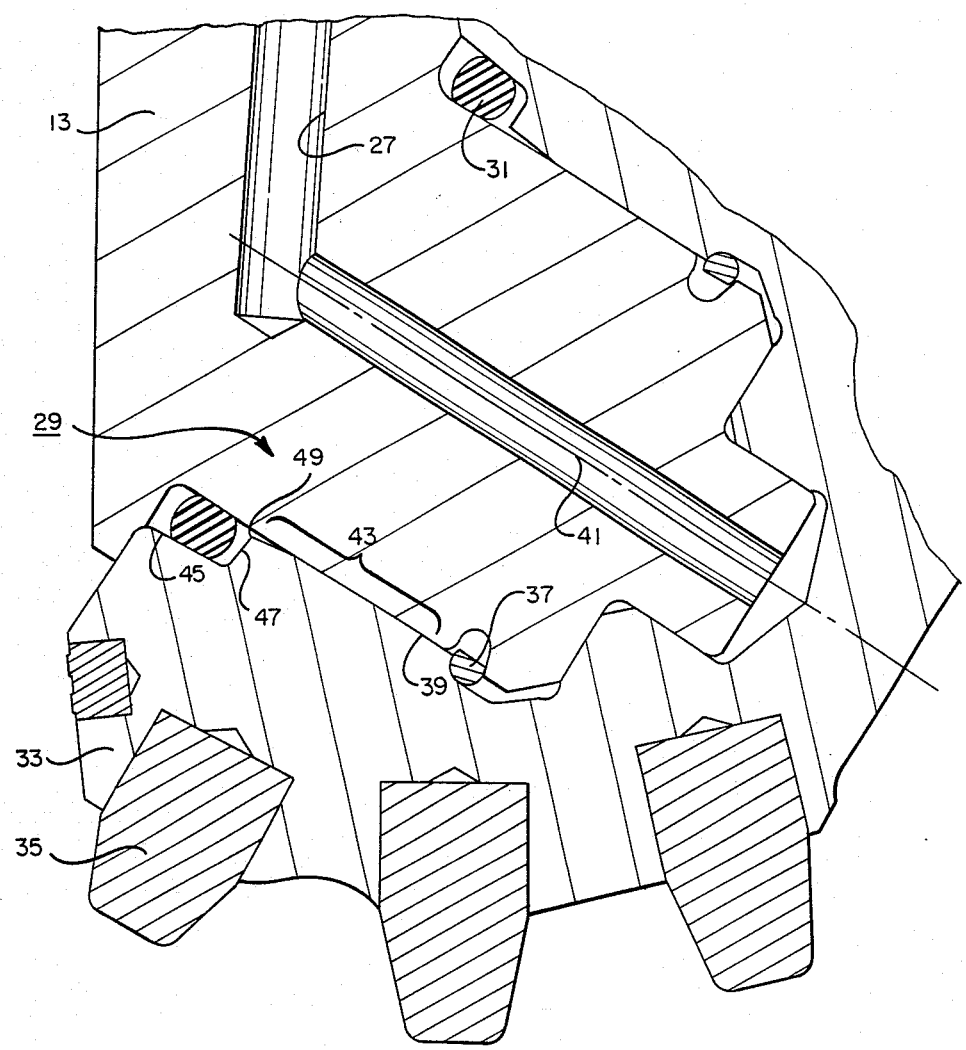
FIG. 2 is a fragmentary longitudinal section of a bit having a modified form of seal recess in the rotatable cutter and the features of the invention.

With reference to FIG. 2, the bearing means 29 consist in this instance of a cantilevered bearing shaft with a cylindrical journal bearing surface 39 formed around a longitudinal axis 41 which extends inwardly and downwardly relative to the bit body 13.

The cutter 33 is secured for rotation about the bearing shaft, with a bearing surface 43 sized to include normal clearance to permit assembly over the journal 39. During drilling the cutter bearing surface 43 opposes and engages the lower or so called "pressure side" of the cylindrical bearing surface 39 of the bearing shaft.

The seal ring 31 is in a groove 45 at the open end of the cutter, the groove having a radial wall 47 which intersects the cutter bearing surface 43 to define a generally rounded corner 49 that opposes the cylindrical bearing surface 39 of the shaft. The corner 49 is normally rounded with a small radius to remove its otherwise sharp edge. High stresses are imposed by the cutter on the pressure side of the shaft, especially by the corner 49 during drilling. These high stresses are augmented when the cutter becomes cocked, which it may do because of the normal clearance between the cutter bearing surface 43 and the journal surface 39.

Figure 3:
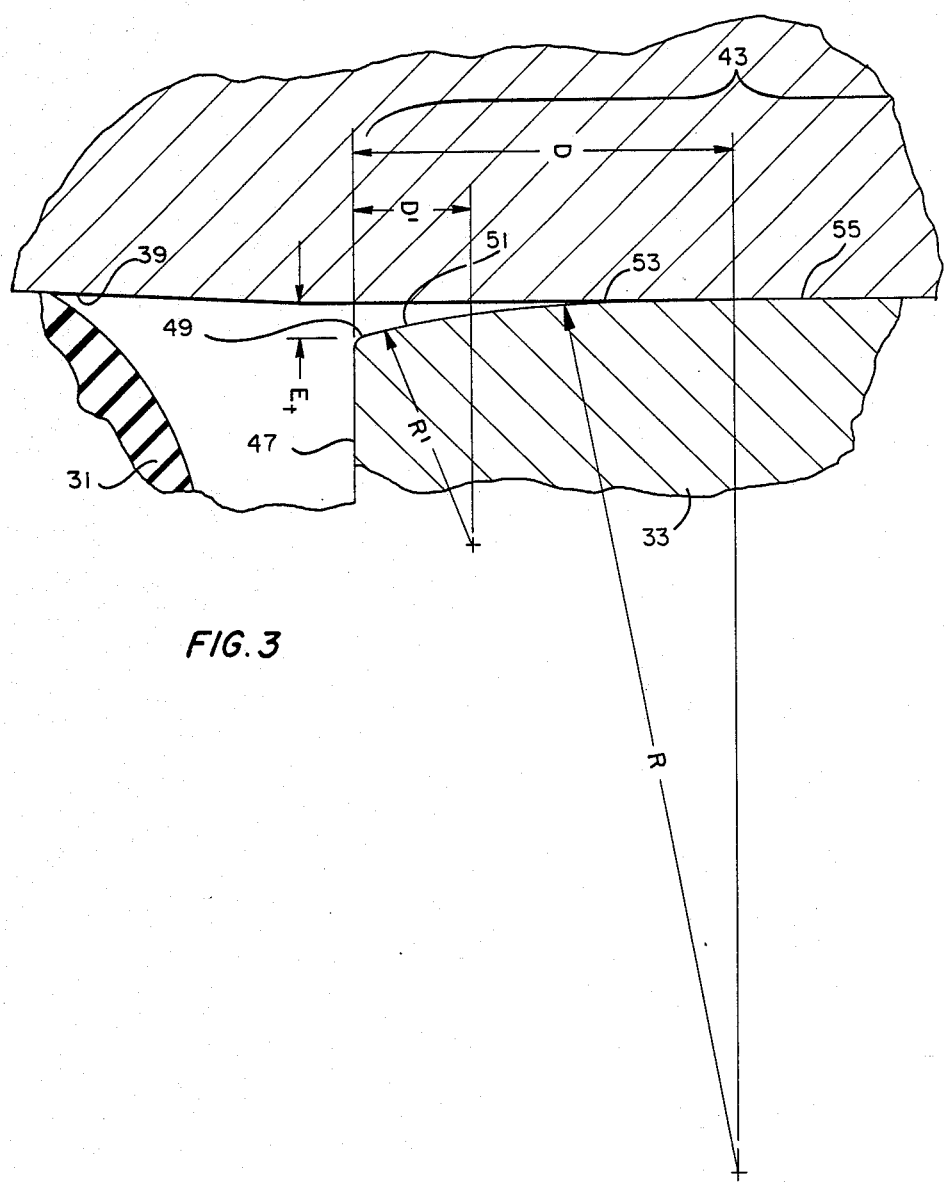
FIG. 3 is an enlarged, fragmentary longitudinal section of that portion of the FIG. 2 bit in the region of the seal recess.

The preferred shape and position of the cutter bearing surfaces 43 are shown in FIG. 3. There is a curved, outer region of the cutter bearing surface 43. In this embodiment the curved outer region consists of an outer toroidal portion 51 and an inner toroidal portion 53 which provide a clearance $E_t$ between the cylindrical bearing portion 55 and the corner 49 when the cutter bearing engages the shaft journal during drilling and in the illustrated "uncocked" position. This clearance gradually diminishes such that there is a reduction of the variation in stress along the shaft bearing surface 39 caused by the engagement with the bearing surfaces 43 of the cutter.

The dimensions defining the toroidal portions 51, 53 of the cutter bearing surfaces 43 in a "Hughes" 12¼ ATJ-11 drill bit are as follows:

$E_t$ = 0.0020 inch
D = 0.150 inch
D = 0.753 inch
R = 185 inch

R=20 inch

The distance D is about one half the length of contact of the cutter bearing surfaces.

The use of the cutter bearing surfaces 43 as shown and described has successfully reduced stress and unit loading on the bearing surface 39 of a bearing shaft in the vicinity of the corner 49. This reduction of stress has been observed to have reduced cracks and spalling of the bearing surface 49 and consequently will extend to the useful life of the bits in which the invention is used.

While the invention has been described in only one of its forms, it should be apparent to those skilled in the art that it is not thus limited, but is susceptible to various changes and modifications without departing from the spirit thereof.

I claim:

1. An earth drilling bit which comprises:
   a body;
   a cantilevered bearing shaft extending inwardly and downwardly from the body;
   a cutter rotatably secured to the bearing shaft, with an open end to permit assembly over the cantilevered bearing shaft;
   the bearing shaft having a journal surface formed around a longitudinal axis;
   the cutter having a bearing surface sized to permit assembly over the journal surface of the shaft;
   a seal groove at the open end of the cutter bearing surface, including an intersecting wall that defines an annular, generally rounded corner to oppose the journal surface of the shaft;
   seal means disposed in the seal groove to confine lubricant between the bearing surfaces;
   the cutter bearing surface having a curved outer region that converges from the annular corner of the seal groove into an inner region to reduce the stress the corner induces upon the journal bearing surface of the shaft during drilling, the curved outer region extending about one half the length of the cutter bearing surface.

2. An earth drilling bit which comprises:
   a body;
   a cantilevered bearing shaft extending inwardly and downwardly from the body;
   a cutter rotatable secured to the bearing shaft, with an open end to permit assembly over the cantilevered bearing shaft;
   the bearing shaft having a cylindrical journal surface formed around a longitudinal axis;
   the cutter having a bearing surface sized to include clearance to permit assembly over the journal surface of the shaft;
   a seal groove at the open end of the cutter bearing surface, including an intersecting all that defines an annular, generally rounded corner to oppose the journal surface of the shaft;
   seal means disposed in the seal groove to confine lubricant between the bearing surfaces;
   the cutter bearing surface having a curved outer region that converges from the annular corner of the seal groove into a cylindrical inner region, the curved region being defined to reduce the stress the corner induces upon the journal bearing surface of the shaft during drilling, including the stress induced by cutter cocking, the curved outer region having an outer toroidal portion of a first radius and an inner toroidal portion with a larger radius than the first radius.

3. The invention defined by claim 1 in which the curved outer region is toroidal in configuration.

* * * * *